US007019668B2

(12) United States Patent
Kinugawa

(10) Patent No.: US 7,019,668 B2
(45) Date of Patent: *Mar. 28, 2006

(54) MANAGEMENT SYSTEM FOR CONSTRUCTION MACHINES

(75) Inventor: Hideki Kinugawa, Hiroshima (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 277 days.

This patent is subject to a terminal disclaimer.

(21) Appl. No.: 10/428,108

(22) Filed: May 2, 2003

(65) Prior Publication Data

US 2003/0193406 A1 Oct. 16, 2003

Related U.S. Application Data

(62) Division of application No. 09/386,169, filed on Aug. 31, 1999, now Pat. No. 6,614,361.

(30) Foreign Application Priority Data

| Aug. 31, 1998 | (JP) | ............................................ | 10-246002 |
| Aug. 31, 1998 | (JP) | ............................................ | 10-246003 |

(51) Int. Cl.
*G08B 21/00* (2006.01)

(52) U.S. Cl. .............................. 340/870.16; 340/425.5; 180/287; 701/50

(58) Field of Classification Search ............ 340/870.16, 340/425.5, 426.1, 426.11; 180/287; 307/10.5; 701/50, 51, 102
See application file for complete search history.

(56) References Cited

U.S. PATENT DOCUMENTS 5,475,597 A 12/1995 Buck

| 5,586,130 | A | 12/1996 | Doyle |
| 5,646,845 | A | 7/1997 | Gudat et al. |
| 5,714,946 | A | 2/1998 | Gottshall et al. |
| 5,719,563 | A | 2/1998 | Thompson, Jr. |
| 6,614,361 | B1 * | 9/2003 | Kinugawa .............. 340/870.16 |

FOREIGN PATENT DOCUMENTS

| EP | 0680859 | 11/1995 |
| EP | 0 839 697 | 5/1998 |
| JP | 5-81502 | 4/1993 |
| JP | 6-330539 | 11/1994 |
| JP | 7-87005 | 3/1995 |
| JP | 7-156721 | 6/1995 |
| JP | 7-189295 | 7/1995 |

(Continued)

*Primary Examiner*—Timothy Edwards, Jr.
(74) *Attorney, Agent, or Firm*—Oblon, Spivak, McClelland, Maier & Neustadt, P.C.

(57) ABSTRACT

To enable positive management of construction machines in a management center. There comprises an construction machine 1, and a management apparatus 20 for carrying out the transmission and reception of information with the construction machine 1 through a communication satellite 30 and a base station 32. The construction machine 1 comprises a memory 124 for storing operating information, information amount discrimination means 127 to discriminate if the operating information stored in the memory 124 reaches a fixed amount, information readout means 128 for reading out the operating information when the operating information stored in the memory 12 reaches the fixed amount, and a transmission section 184 for transmitting the operating information read out. The management apparatus 20 comprises a reception section 214 for receiving the operating information transmitted from the construction machine 1, a memory 208 for storing the operating information received, and data processing means 211 for carrying out data processing relative to the operating information.

6 Claims, 8 Drawing Sheets

FOREIGN PATENT DOCUMENTS

| | | |
|---|---|---|
| JP | 8-144312 | 6/1996 |
| JP | 8-164824 | 6/1996 |
| JP | 8-185577 | 7/1996 |
| JP | 8-273015 | 10/1996 |
| JP | 08-301072 | 11/1996 |
| JP | 9-48324 | 2/1997 |
| JP | 9-50584 | 2/1997 |
| JP | 9-68436 | 3/1997 |
| JP | 9-95213 | 4/1997 |
| JP | 9-137746 | 5/1997 |
| JP | 9-144633 | 6/1997 |
| JP | 9-175329 | 7/1997 |
| JP | 9-240431 | 9/1997 |
| JP | 9-256417 | 9/1997 |
| JP | 10-46631 | 2/1998 |
| JP | 10-116303 | 5/1998 |
| JP | 10-183690 | 7/1998 |
| JP | 10-194087 | 7/1998 |

* cited by examiner

MANAGEMENT SYSTEM FOR CONSTRUCTION MACHINES

BACKGROUND OF THE INVENTION

1. Field of the Invention

The present invention relates to an information management system for managing construction machines.

2. Description of the Prior Art

In the rental industry of construction machines such as a hydraulic excavator used in the construction site, there has been heretofore generally employed a system for calculating the rental (fare) on the basis of an actual using period instead of calculation of the rental on the basis of a lending period, unlike other rental systems for private cars. For example, if the actual using period is four days even the lending period is seven days, the rental for four days is charged.

The rental is normally calculated by the management center for managing the construction machines on the basis of the self-report of a using period by a renter. However, it is also possible that operating information of a construction machine together with date and time be stored in an IC card set in the construction machine, and the rental is calculated on the basis of the operating information stored therein.

On the other hand, the mechatronics has been progressed also in the field of construction machines so that various operations of the operating section are controlled by means of a computer. However, the bug is found in the program stored in a memory after the start of using the machine, or the construction machine is used in a manner not expected at the time of development due to the diversification of uses thereof, and as a result, programs or data (hereinafter referred to as control information) are sometimes necessary to be changed. In such as case as described above, in the past, a serviceman carrying a recording medium such as a floppy disc or CD-ROM in which control information to be updated is written goes to the construction site from the management center for managing the construction machines to update the control information using the recording medium carried.

Incidentally, in the case where the rental for the construction machine is calculated, if the actual using period is left to the renter's self-report, even if the excessively small report less than the actual operating days should be done, the rental agent cannot but believe it, thus posing a problem that the recovery efficiency of the rental lowers. Further, also in the case of the IC card, when it is not set to the machine at the time of operation, the accurate using period is unknown, thus posing a problem that even if one does wrong, the agent cannot but believe the data stored in the IC card. Moreover, also in the case of the renter's self-report and in the case of the IC card, there poses a problem that the management center for managing the construction machines cannot obtain operating information at real time.

On the other hand, in the case where control information of programs or the like is updated, when the serviceman goes to the construction site from the management center for managing the construction machines, it takes time even merely to grasp the operating place if the construction machine is located in a remote region such as the mountains, and in the case where the construction machine is being operated, it is necessary to wait till the operation is completed, thus posing a problem that it takes a considerable period of days to update control information of a number of construction machines scattered in various places. Further, an attempt is made to carry out the updating of control information of a number of construction machines in a short period of time, a number of servicemen who are familiar to operation of a personal computer or the like, thus posing a problem that it is difficult to secure such a man of ability.

That is, the occurrence of various problems as noted above results from the fact that the construction machine is used in a place remote from the management center.

Further, resulting from the fact that the construction machine is used in a place remote from the management center, it occurs the problem that it is impossible to cope with theft rapidly when the construction machine is stolen.

SUMMARY OF THE INVENTION

It is an object of the invention to provide a management system for construction machines capable of positively managing construction machines in a management center.

A management system for construction machines of this invention comprises a construction machine comprising memory means for storing management information, a management center comprising management means for managing a construction machine using control information, and communication means for carrying out the transmission and reception of management information through a communication satellite, which are installed in the construction machine and the management center respectively.

According to this constitution, the communication is carried out through the communication satellite in relation to information stored in memory means of a construction machine. Thereby, the delivery and reception of information are carried out at real time between the construction machine and the management center, and the construction machine can be positively managed in the management center. It is to be noted that the management center termed herein is a place where the construction machine is managed, and may be any place such as the head office, a branch office, a place of business, and the like.

Preferably, the management information may be operating information of the construction machine, wherein the construction machine providing read-out means for reading out the operating information stored in the memory means for the purpose of transmitting it to the management center, and also the management means may manage operation of the construction machine using operating information.

According to this constitution, the operating information stored in the memory means is read out by the read-out means, and the operating information read out is transmitted to the management center through the communication satellite. Thereby, delivery and reception of information are carried out at real time between the construction machine and the management center, and the construction machine can be positively managed in the management center. The operating information termed herein are various information generated in relation to the operation of the construction machine. In the case where the construction machine is operated, for example, by the engine, the information includes date and time for start of engine, date and time for stop of engine, and the like.

Moreover, preferably, the construction machine may comprise discrimination means for discriminating if the read-out means fulfills the readable conditions of the operating information stored in the memory means, wherein the read-out means reads out the operating information in case the discrimination means discriminates that the said read-out means fulfills the readable conditions.

According to this constitution, if being fulfilled with the readable conditions of the operating information stored in the memory means, the operating information stored in the memory means is read out. Thereby, the delivery and reception of information is carried out at real time between the construction machine and the management center when necessary, and the construction machine can be positively controlled in the management center.

The said readable conditions can be selected from that the operating information stored in the memory means assumes a fixed amount, the time is the fixed time, or that the communication means of the construction machine receives the command information transmitted from the management center.

Preferably, in the management system for construction machines of this invention, the management information may be the control information and the construction machine may comprise updating means for receiving control information from the management center by the reception means to thereby update the control information stored in the memory means.

According to this constitution, the control information is received by the reception means, and the control information stored in the memory means is updated by the control information. Thereby, the control information of the construction machine is updated without any help from others, and the construction machine can be managed positively in the management center. The control information is various information relating to the control of an operating section of the construction machine, for example, a control program and data for controlling an attachment.

Moreover, preferably, the construction machine may comprise discrimination means for discriminating if the operating section is in a stop state, wherein the management center transmitting the control information to the construction machine in case the discrimination means discriminate that the operating section is in a stop state and the updating means updating the control information.

According to this constitution, when the operating section is in a stop state, the control information is updated by the updating means. Thereby, the updating of the control information is positively carried out.

Moreover, preferably, management means may comprise inquiry means for inquiring about version number of the control information stored in the memory means, and if it is not the latest version number, the control information is transmitted by the transmitting means.

According to this constitution, if the control information stored in the memory means of the construction machine is not the inquired version number, the control information is transmitted. Thereby, the updating of the control information can be carried out effectively.

Moreover, in the management system for the construction machines of this invention, preferably, the construction machine may comprise anti-theft device, wherein the control information is an operation stop signal transmitted from the management center, and the anti-theft device may operate in case it receives the operation stop signal transmitted from the management center.

Thus, in the anti-theft system which utilizes an artificial satellite, by transmitting an operation stop signal to a hydraulic excavator present in a remote place at the time when the theft of the excavator has become clear, it is possible to make control under the utilization of satellite communication so that the engine of the hydraulic excavator cannot be started, or the engine is stopped, or the machine body cannot be operated hydraulically.

Moreover, in the management means, preferably, a work area of the construction machine is set in advance, the position of the construction machine is measured using a GPS, and when the measured position of the construction machine is outside the work area, the operation stop signal is transmitted to the construction machine.

Thus, where there is added the function of measuring the position of each hydraulic excavator by utilizing the GPS, the operation of the hydraulic excavator can be stopped when the hydraulic excavator has deviated or is deviating a preset work area, whereby the occurrence of theft can be prevented.

Moreover, an anti-theft device may cut off not only a power circuit to a starter motor and also cut off either a circuit for the supply of pressure oil to a remote control valve or a circuit for the supply of fuel to an engine.

DETAILED DESCRIPTION OF PREFERRED EMBODIMENTS

Figure 1:
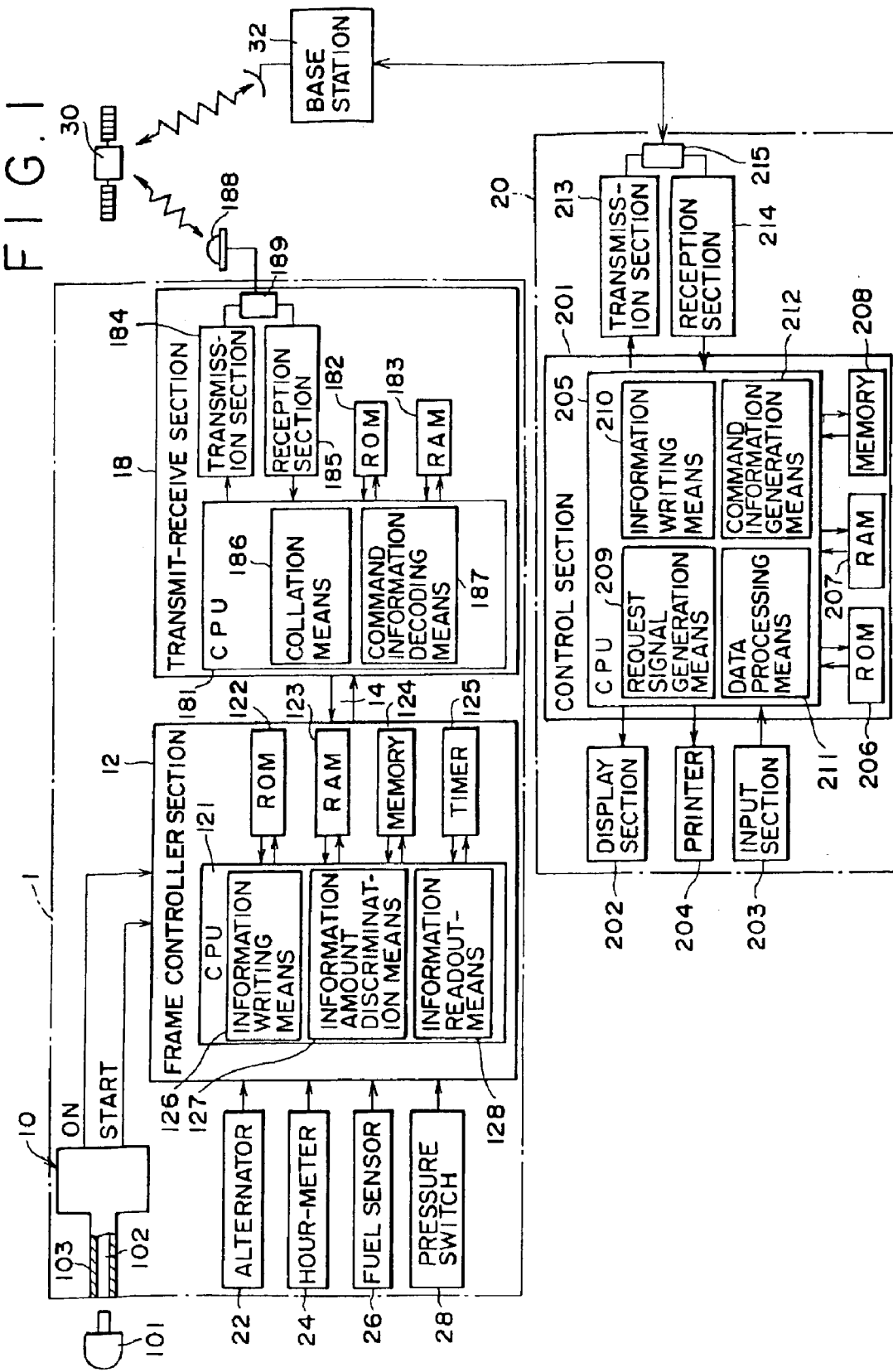
FIG. 1 is a view showing the constitution of an information management system to which a construction machine is applied according to one embodiment of the present invention.

FIG. 1 is a view showing the schematic constitution of a management system (an operating information management system) according to one embodiment of the present invention. Referring to FIG. 1, the information control system comprises a construction machine 1 such as a hydraulic excavator, and a management apparatus 20 for carrying out the transmission and reception of information with the construction machine 1 through a communication satellite 30 and a base station (an earth station) 32.

The construction machine 1 comprises a key switch unit 10 on which a start key for starting the engine is mounted, a frame controller section 12 for receiving a signal output from the key switch unit 10, and a transmit-receive section 18 connected to the frame controller section 12 by means of a connection cable 14 to carry out the transmission and reception of information with the base station 32 through the communication satellite (an artificial satellite) 30.

The key switch unit 10 is provided with a key switch 103 which has a key hole 102 into which a start key 101 is inserted, and which can be switched from a "LOCK" position which is a position into which the start key 101 is inserted and from which it is removed to an "ON" position and a "START" position.

The frame controller section 12 comprises a CPU (Central Processing Unit) 121 for carrying out a fixed operation and control processing, a ROM (Read-Only Memory) 122 in which a fixed control program is stored, a RAM (Random Access Memory) 123 for temporarily storing processing data, an electrically rewritable memory 124 such as an EEPROM (Electrically Erasable Programmable Read Only Memory) or a flash EEPROM for storing operating information, and a timer 125 having a calendar function for a timer. The CPU 121 comprises information writing means 126 for writing operating information and date and time information into the memory 124, information amount discrimination means 127 to discriminate if operating information stored in the memory 124 reaches a fixed amount, and function realizing means as operating information read-out means 128 for reading out operating information stored in the memory when the operating information reaches a fixed amount.

Further, connected to the frame controller section 12 are a key switch unit 10 on which a start key is mounted, an alternator 22 constituting a power supply section of the construction machine 1 together with a battery, an hour meter 24 actuated when the alternator 22 is operated, a fuel sensor 26 installed within a fuel tank in which fuel such as gasoline, light oil or the like is stored, and a pressure switch 28 installed on an operating lever for operating an attachment, an signals output therefrom are input into the controller section 12. The key switch unit 10, the alternator 22, the hour meter 24, the fuel sensor 26 and the pressure switch 28 constitute detection means for detecting operating information of the construction machine 1.

When the start key 10 is inserted into the key hole 102 and the key switch 103 is turned from the "LOCK" position to the "START" position via the "ON" position, the frame controller section 12 causes the start motor to drive to start the engine of the construction machine 1 while controls the operation of the entire construction machine 1. Simultaneously with the start of the engine, fixed signals are input into the frame controller section 12 from the alternator 22, the hour meter 24, the fuel sensor 26 and the pressure switch 28, and the signals input are stored in the memory 124 while corresponding to the date and time information output from a timer 125 as operating information. Thereby, the operating information of the construction machine 1 such as the engine start date and time, engine stop date and time, engine total operating time, fuel consumption amount, and work stop time can be collected.

That is, the time at which the "START" signal is output from the key switch 103, the engine is started and a generation signal is output from the alternator 22 is stored as the engine start date and time. Further, the time at which the engine is stopped, the "ON" signal being output from the key switch 103 disappears and the generation signal being output from the alternator 22 disappears is stored as the engine stop date and time.

The fuel consumption amount is calculated every fixed time on the basis of a signal output from the fuel sensor 26 and stored as the accumulated value. The work stop time is measured on the basis of a signal output from the pressure switch 28. That is, the time at which the generation signal is output from the alternator 22 and the "ON" signal (a signal output when the attachment is operated) is not output from the pressure switch 28 is counted as the work stop time and stored as the accumulated value. The operating information stored in the memory 124 are read out of the memory 124, on condition that the information amount (data amount) reaches a fixed amount, and transmitted to the transmit-receive section 18 through the connection cable 14.

The transmit-receive section 18 comprises a CPU 181 for carrying out fixed operation and control processing, a ROM 182 in which fixed control program and discrimination information (ID code) are stored, a RAM 183 for temporarily storing processing data, a transmission section 184 for transmitting operating information read out of the memory 124 together with discrimination information read out of the ROM 182 to the base station 32 through the communication satellite 14, and a reception section 185 for receiving discrimination information and command information transmitted from the management apparatus 20 through the base station 32 and the communication satellite 142.

The CPU 181 comprises collation means 186 for collating discrimination information being transmitted from the management apparatus 20 with discrimination information being stored in the ROM 182 to discriminate coincidence or non-coincidence, and function realizing means as command information decoding means 187 for decoding command information being transmitted from the management apparatus 20 when the discrimination information are coincided. An antenna 188 for communication with the communication satellite 14 is connected to the transmission section 184 and the reception section 185 through a duplexer 189. The operating information stored in the memory 124 is to be erased after having been transmitted to the base station 32.

The management apparatus 20 is constituted, for example, by a personal computer or the like, and receives operating information of the construction machine 1 transmitted from the base station 32 while processes the operating information to manage the construction machine 1. The management apparatus 20 comprises a control section 202 for controlling the operation of the entire management apparatus 20, a display section 201 comprising a CRT or the like displaying operating information subjected to data processing, an input section 203 such as a keyboard for inputting a control signal or the like into the control section 201, and a printer 204 for printing out the operating information subjected to data processing.

The control section 201 comprises a CPU 205 for carrying out fixed operation and control processing, a ROM 206 in which fixed control program and discrimination information are stored, a RAM 207 for temporarily storing processing data, and a rewritable memory 208 such as EEPROM or flash EEPROM for storing discrimination information and operating information of the construction machine 1 as the management object.

The CPU 205 comprises request signal generation means 209 for requesting the base station 32 transmission of discrimination information and operating information of the construction machine 1 being stored in the memory within the base station 32, information writing means 210 for writing discrimination information and operating information transmitted into the memory 208, data processing means 211 for carrying out fixed data processing (for example, processing of information, for example, such as tabling or graphing data) on a unit of discrimination information with respect to the operating information (that is, on a unit of construction machine) written in the memory 208, and function realizing means as command information generation means 212 for commanding the construction machine 1 transmission of operating information stored in the memory 124.

Connected to the CPU 205 are a transmission section 213 for transmitting command information to the base station 32, and a reception section 214 for receiving discrimination information and operating information transmitted from the base station 32, the CPU 205 being connected to the base station 32 through a DSU (Digital Service Unit) 215 so as to enable communication.

In the present embodiment, the engine start date and time and the engine stop date and time are displayed in the display section 202 in a table form, for example, as shown in Table 1, on the basis of the operating information received, and printed out by the printer 204. Further, the time measured by the hour meter 24 is displayed in Table 1 corresponding to the engine start date and time and the engine stop date and time. Of course, it is also possible to display and print out the engine operating time, fuel consumption amount, work stop time and the like. Further, in the case where as the operating information, only the engine start date and time and the engine stop date and time are necessary, signals from the fuel sensor 26 and the pressure switch 28 are unnecessary.

TABLE 1

| No. | Operating Information | Year | Month | Date | Time | Min. | Hour meter (time) |
|---|---|---|---|---|---|---|---|
| 1 | Engine start | 1998 | 05 | 22 | 9 | 30 | 180 |
| 2 | Engine stop | 1998 | 05 | 22 | 11 | 40 | 182 |
| 3 | Engine start | 1998 | 05 | 22 | 12 | 50 | 182 |
| 4 | Engine stop | 1998 | 05 | 22 | 15 | 20 | 184 |
| 5 | Engine start | 1998 | 05 | 22 | 16 | 00 | 184 |
| 6 | Engine stop | 1998 | 05 | 22 | 16 | 50 | 185 |
| 7 | Engine start | 1998 | 05 | 23 | 08 | 00 | 185 |
| 8 | Engine stop | 1998 | 05 | 23 | 09 | 30 | 187 |
| 9 | Engine start | 1998 | 05 | 23 | 09 | 50 | 187 |
| 10 | Engine stop | 1998 | 05 | 23 | 10 | 20 | 187 |
| ... | ... | ... | ... | ... | ... | ... | ... |
| ... | ... | ... | ... | ... | ... | ... | ... |
| ... | ... | ... | ... | ... | ... | ... | ... |

The accurate using days of the construction machine 1 can be confirmed from the engine start date and time and the engine stop date and time of Table 1 thus obtained, and the accurate rental can be calculated from the using days. Further, replacing time of consuming parts such as oil filter, oils and fats such as engine oil, and the like can be controlled by the total engine operating time, and the work time of an operator can be obtained from the work stop time. The running cost of the construction machine 1 can be obtained from the total fuel consumption amount, and the leaving time of the construction machine 1 is known from the final engine stop date and time to enable control of batteries and the like.

The communication satellite 30 is a low orbit turn-around satellite launched on the polar orbit, for example, near the altitude of 780 km, which once receives the operating information of the construction machine 1 transmitted from the transmission section 184 through the antenna 188 and then transmits it to the base station 32. The base station 32 stores the operating information of the construction machine 1 transmitted through the communication satellite 30 in a memory assigned to the management apparatus 20.

Figure 2:
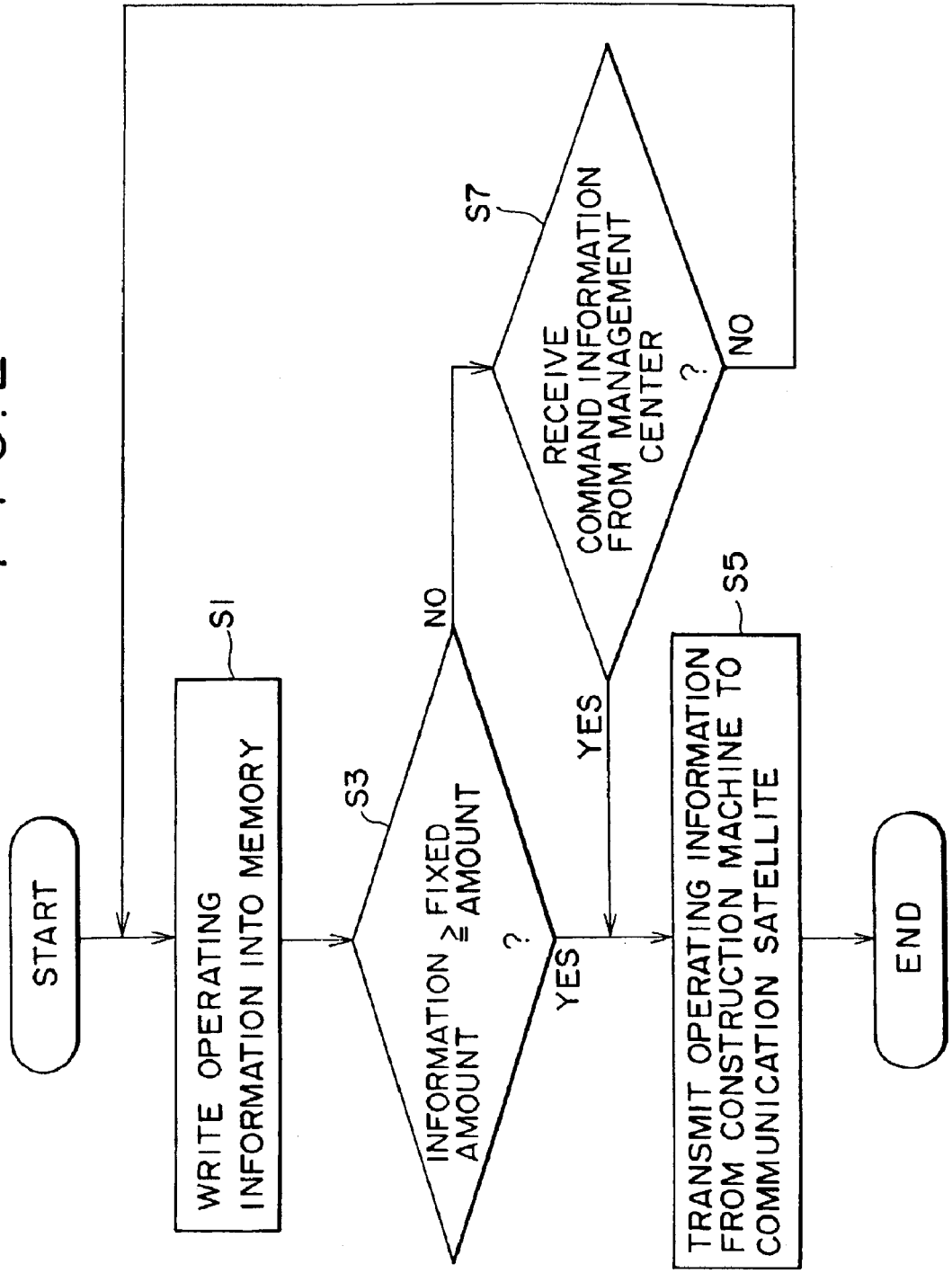
FIG. 2 is a flowchart for explaining the transmit-receive operation on the side of the construction machine of the information management system shown in FIG. 1.

Next, the outline of the transmit-receive operation of information on the side of the construction machine 1 of the information management system constituted as described above will be explained with reference to a flowchart shown in FIG. 2.

When the engine for the construction machine 1 is started, output signals from the alternator 22 and the hour meter 24 are taken into the frame controller 12, which signals along with the date and time information from the timer 125 are written, as operating information, into the memory 124 by the information writing means 126 (Step S1).

This operating information is obtained on the basis of the output signals form the key switch unit 10 and the alternator 22, as mentioned above. For example, the time at which a "START" signal is output from the key switch 103, and the engine is started and a generation signal is output from the alternator 22 is written as the engine start date and time. The time at which an "ON" signal being output from the key switch 103 disappears and a generation signal being output from the alternator 22 disappears is written as the engine stop date and time.

Subsequently, discrimination is made if the information amount (data amount) of operating information stored in the memory 124 reaches a level in excess of a fixed value (Step S3). When the judgement is affirmed, the operating information stored in the memory 124 is read out by the information read-out means 128, and transmitted by the transmission section 184 to the communication satellite 30 through the antenna 188 (Step S5).

Alternatively, the residual storage amount is calculated from the total storage amount of the operating information, and when the residual storage amount is smaller than a fixed value, the operating information is transmitted to the communication satellite 30. The operating information transmitted to the communication satellite 30 is transmitted to the base station 32 and stored in the memory in the base station 32. The operating information is normally transmitted in a compressed state, and is to be interpreted when it is taken into the management apparatus 20.

When the judgement is denied in Step S3, discrimination is made if command information from the management center to the effect that the operating information stored in the memory 124 is read out and transmitted to the communication satellite 30 is received (Step S7). This judgement is executed by the command information decoding means 187. In this judgement, however, whether or not the discrimination information transmitted from the management center coincides with the discrimination information stored in the ROM 82 is collated by the collation means 186, and only in the case of coincidence, the judging operation is executed.

When in Step S7, the judgement is affirmed, the procedure shifts to Step S5. When in Step S7, the judgement is denied, the procedure returns to Step S1, where thereafter operations are repeatedly executed. When in Step S5, the operating information is transmitted to the communication satellite 30, the operating information stored in the memory 124 is erased.

Figure 3:
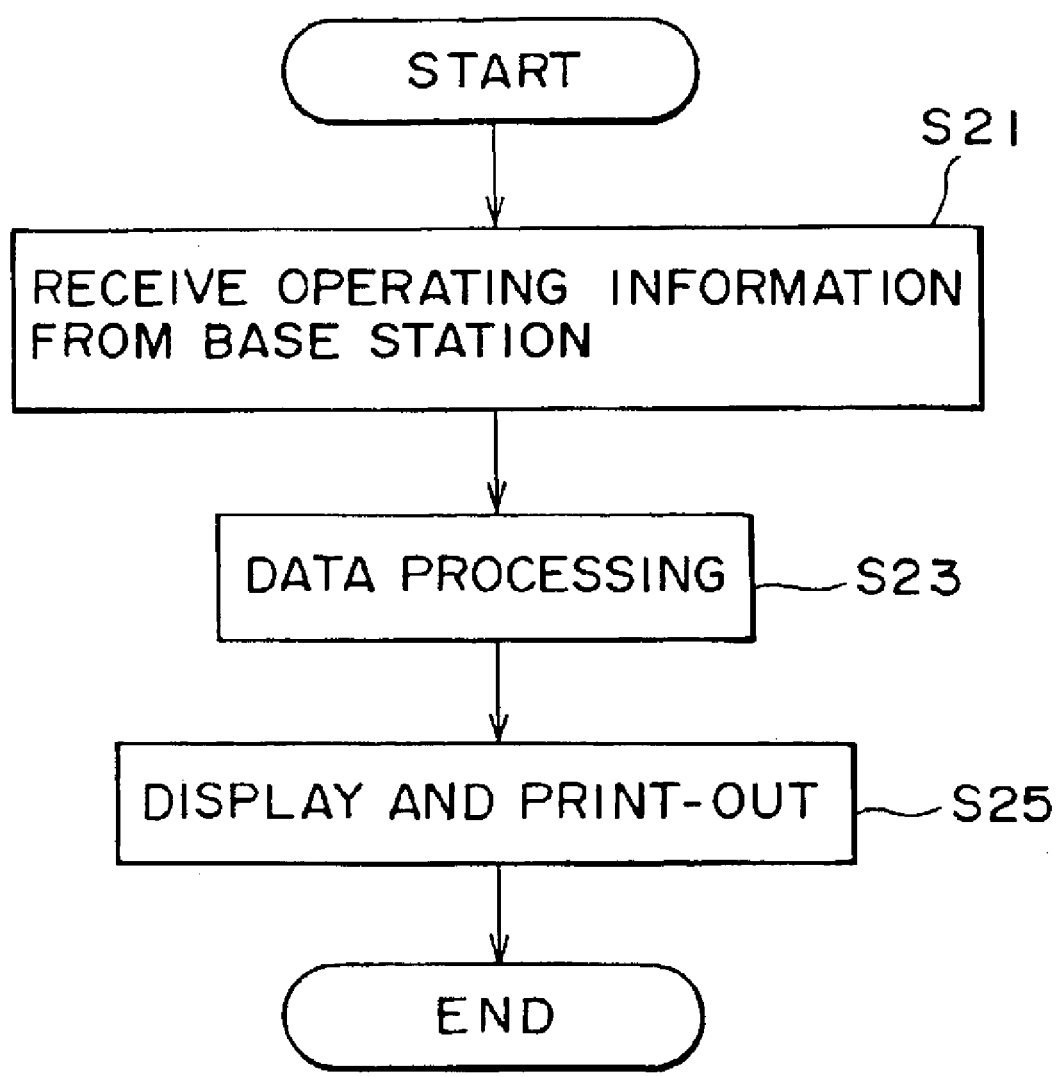
FIG. 3 is a flowchart for explaining the transmit-receive operation on the side of a control apparatus of the information management system shown in FIG. 1.

Next, the outline of the transmit-receive operation of information on the side of the management apparatus 20 of the information control system constituted as described above will be explained with reference to a flowchart shown in FIG. 3.

First, for example, the input section 203 is operated at the fixed time every day whereby the operating information stored in the memory of the base station 32 is received by the management apparatus 20 (Step S21). A request signal output from the request signal generation means 209 is transmitted from the transmission section 213 to the base station 32 by the operation of the input section 203. The operating information stored in the memory of the base station 32 is read out according to the request signal, whereas the operating information read out is transmitted from the base station 32 to the management apparatus 20.

The operating information transmitted is received by the reception section 214 and is written together with the discrimination information into the memory 208 by the information writing means 210.

Then, the operating information written into the memory 208 is subjected to fixed data processing (processing of information) (Step S23). The processed result is displayed on the display section 202 whereas it is printed out on a sheet of recording paper by the printer 204 as necessary (Step S25). The operating information written into the memory 208 remains stored till an erase command signal is output by the operation of the input section 203.

Note, in the case where the operating information stored in the memory 24 of the construction machine 1 does not reach a fixed amount, transmission of operating information to the base station is not effected, and therefore, the operating information cannot be received by the management apparatus 20. In such a case, when command information output from the command signal generation means 211 is transmitted to the base station 32 by the transmission section 213 by the operation of the input section 203 as necessary, the command information is transmitted from the base station 32 to the construction machine 1 through communication satellite 30.

In the construction machine 1, as described above, the operating information stored in the memory 124 is read out upon receipt of the command information, and the operating information is transmitted to the base station 32 through the communication satellite 30. Therefore, the management apparatus 20 is possible to take in the operating information.

In the management system according to the present invention, as in the above-mentioned embodiment, it is possible to obtain the accurate operating information of the construction machine at real time in the management center, and to positively manage the construction machine in the management center.

While in the present embodiment, a disclosure is made such that the present invention is applied to the construction machine such as a hydraulic excavator, it is to be noted that he invention can be also applied to various construction machines such as trucks, private cars and the like. Accordingly, also with respect to the operating information, various information generated in relation to the operation of the construction machine applied are collected.

Further, while in the present embodiment, in the case where operating information stored in the memory 124 of the construction machine 1 reaches a fixed amount and in the case where a request is made from the management apparatus 20, the operating information is read out of the memory 124 to transmit it to the management apparatus 20, it is to be noted that when the operating information irrespective of its number can be also read out of the memory 124 when reaching the fixed time every day (for example, the work termination time in the evening, for example). In this case, the CPU 121 may be provided with function realizing means as time discrimination means to discriminate if the time reaches the fixed time. In the case where transmission is desired to be done when the operating information stored in the memory 124 reaches the fixed amount, the communication charge can be suppressed effectively.

Further, while in the present embodiment, the management apparatus 20 receives the operating information of the construction machine 1 from the base station 32, it is to be note that the operating information of the construction machine 1 may be received directly from the communication satellite 30 without intervention of the base station 32. In this case, the management apparatus 20 may have the function similar to the base station 32. In short, the constitution may be provided wherein the operating information can be transmitted from the construction machine 1 to the management apparatus 20 through the communication satellite 30 irrespective of the presence or absence of the base station 32.

Further, while in the present embodiment, both the frame controller section 12 and the transmit-receive section 18 of the construction machine 1 are provided with a control section comprising CPU and ROM, it is to be noted that for example, the control section of the frame controller section 12 may serve as the control section of the transmit-receive section 18.

Figure 4:
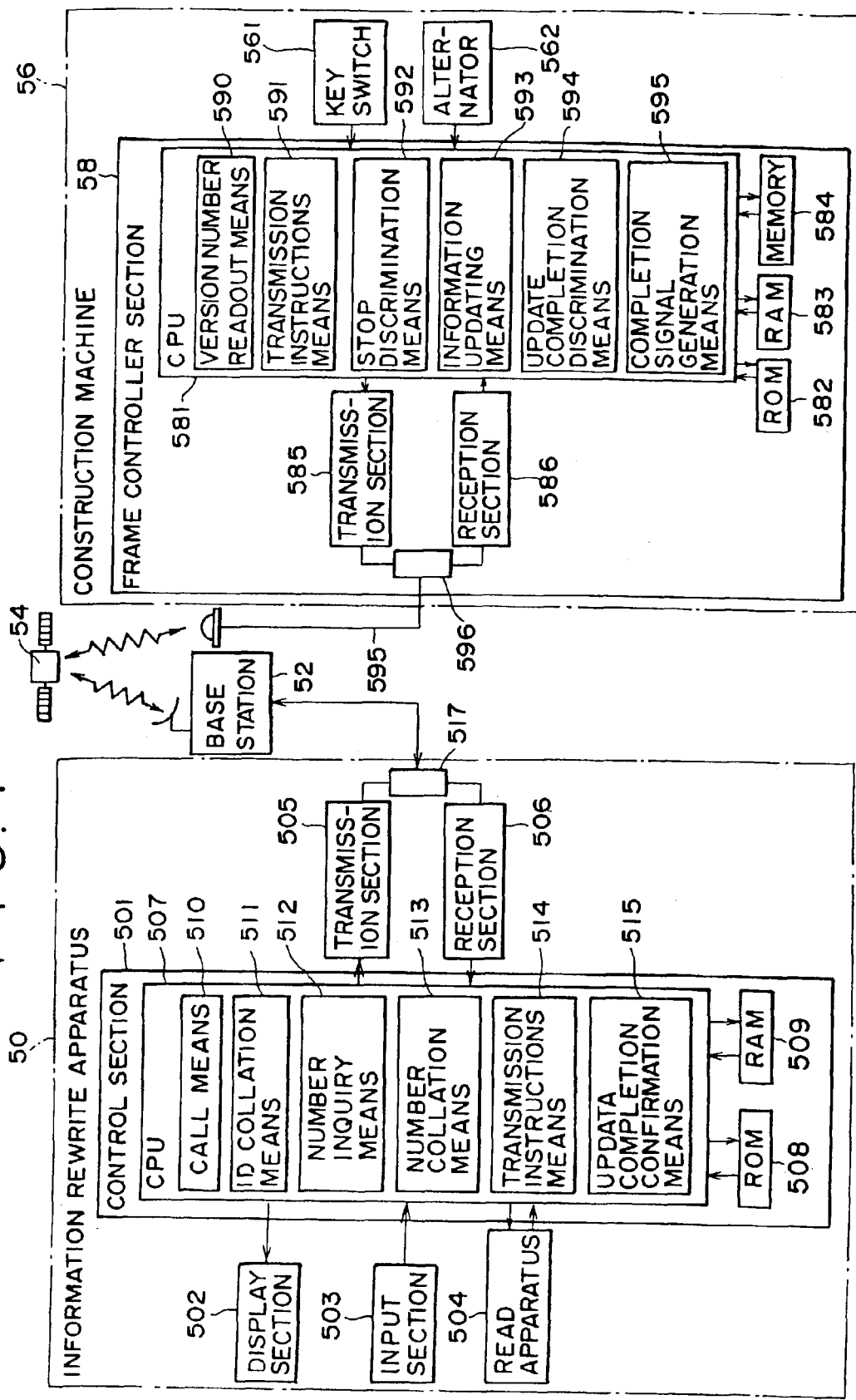
FIG. 4 is a view showing the constitution of an information management system to which a construction machine is applied according to a further embodiment of the present invention.

FIG. 4 schematically shows the constitution of an information management system (a control information management system) according to a further embodiment of the present invention. In the figure, in the information management system, a control program or data (hereinafter referred to as control information) for controlling operation of an construction machine operated in the mountain or the like is transmitted from the management center to the construction machine through the communication satellite so as to automatically update operation control information.

That is, this information management system comprises an information rewriting apparatus (information transmission apparatus) 50 installed in the management center, and an construction machine 56 such as a hydraulic excavator for carrying out the transmission and reception of information with the information rewriting apparatus 50 through a base station 52 and a communication satellite 54.

The information rewriting apparatus 50 is constituted, for example, by a personal computer or the like, and comprises a control section 501 for controlling operation of the entire information rewriting apparatus 50, a display section 502 comprising a CRT or the like for displaying fixed information, an input section 503 such as a keyboard for inputting a control signal or the like into the control section 501, a read apparatus 504 for reading control information written into a recording medium such as a floppy disk, a transmission section 505 for transmitting control information read by the read apparatus 504 together with discrimination information to the base station 52, and a reception section 506 for receiving discrimination information and version number information being transmitted from the construction machine 56 through the communication satellite 54 and the base station 52.

The control section 501 comprises a CPU 507 for carrying out fixed operation and control processing, a ROM 508 in which fixed control program and discrimination information are stored, and a RAM 509 for temporarily storing processed data and control information read by the read apparatus 504. Connected to the control section 501 are the display section 502, the input section 503, the read apparatus 504, the transmission section 505 and the reception section 506.

The CPU 505 comprises call means 510 for calling one construction machine 56 out of a plurality of construction machines 56, ID collation means 511 for collating discrimination information being transmitted from the construction machine 56 called with discrimination information stored in the ROM 506 to discriminate coincidence or non-coincidence, number inquiry means 512 for inquiring the version number of control information stored in a memory 584 described later of the construction machine 56 when the discrimination information is coincided, number collation means 513 for collating version number information being transmitted from the construction machine 56 with the latest version number to discriminate coincidence or non-coincidence, transmission direction means 514 for directing transmission of control information of the latest version read by the read apparatus 504 when the version number is not coincided, and function realizing means as update completion confirmation means 515 for receiving an update completion signal being transmitted from the construction machine 56 to confirm completion of updating.

The transmission section 505 and the reception section 506 are connected capable of being communicated through the base station 52 and the DSU 517. The control information stored in the RAM 509 is to be erased after completion of update of control information written in the memory 584 described later of the construction machine 56.

The base station 52 transmits control information transmitted from the information rewriting apparatus 50 to the construction machine 56 toward the communication satellite 54, and once stores discrimination information and version number information transmitted from the construction machine 56 through the communication satellite 54 in a memory assigned to the information rewriting apparatus 50. The communication satellite 54 is a low orbit turning satellite launched on the polar orbit, for example, near the altitude of 780 km, which once receives control information transmitted from the base station 52, after which transmits it to the construction machine 56 whereas once receives discrimination information and version number information transmitted from the construction machine 56, after which transmits them to the base station 52.

The construction machine 56 is such as a hydraulic excavator, and comprises a frame controller section 58 for controlling operation of the entire construction machine 56. The frame controller section 58 comprises a CPU 581 for carrying out fixed operation and control processing, a ROM 582 in which fixed control programs and discrimination information are stored, a RAM 583 for temporarily storing processed data and control information transmitted from the information rewriting apparatus 50, an electrically rewritable memory 584 such as an EEPROM or a flash EEPROM for storing control information together with version number, a transmission section 585 for transmitting discrimination information read out of ROM 582 and memory 584 and version number information to the base station 54, and a reception section 586 for receiving control information transmitted from the information rewriting apparatus 50.

Further, connected to the CPU 581 are a key switch 561 on which a start key for starting the engine of the construction machine 56 is mounted, and an alternator 562 constituting a power supply of the construction machine 56 together with a battery, and signals output therefrom are input into the CPU 581. When the start key is inserted into the key hole of the key switch 561 and turned to a "START" position via an "ON" position from a "LOCK" position, the start motor is driven to start the engine of the construction machine 56, after which the key switch 561 returns to the "ON" position. The alternator 562 is driven simultaneously when the engine is started.

Thereby, when an "ON" signal is output from the key switch 561 and a drive signal is output from the alternator 562, judgement is made that the operating section of the construction machine 56 is in an operating state, and when an "ON" signal from the key switch 561 and a drive signal from the alternator 562 disappear, judgement is made that the operating section of the construction machine 56 is in a stop state.

The CPU 581 comprises version number read-out means 590 for reading out the version number of control information stored in the memory 584 according to the inquiry of the version number from the information rewriting apparatus 50, transmission direction means 591 for directing transmission of the version number read out to the information rewriting apparatus 50, stop discrimination means 592 to discriminate if the operating section (a bucket of the hydraulic excavator or the like) of the construction machine 56 is in a stop state, information updating means 593 for once taking control information transmitted from the information rewriting apparatus 50 together with the version number into the RAM 583 while transferring control information taken into the RAM 583 together with the version number into the memory 584 when the construction machine 56 is in a stop state and updating control information of old version stored in the memory 584, update completion discrimination means 594 to discriminate if the updating of control information stored in the memory 584 is completed, and function realizing means as completion signal generation means 595 for generating an update completion signal when the updating of control information is completed.

An antenna 595 for communication with the communication satellite 54 is connected to the transmission section 585 and the reception section 586 through a duplexer 596.

Figure 5:
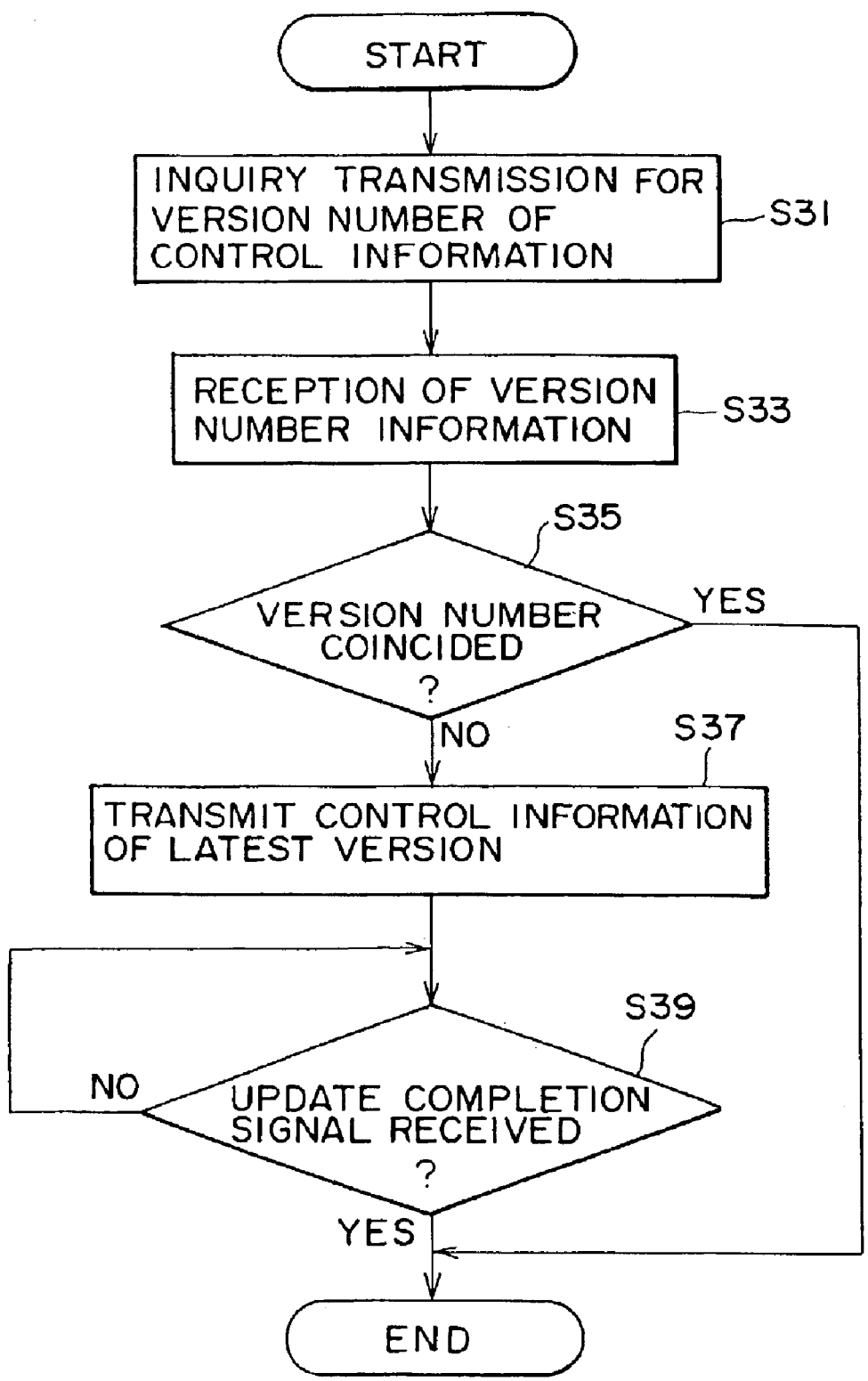
FIG. 5 is a flowchart for explaining the operation on the side of an information rewriting apparatus of the information management system shown in FIG. 4.

Next, the outline of transmit-receive operation of information on the side of the information rewriting apparatus 50 of the information management system constituted as described above will be described with reference to a flowchart shown in FIG. 5.

First, an inquiry signal is output from the number inquiry means 512 to the single construction machine 56, and the inquiry of the version number of control information stored in the memory 584 is carried out (Step S31). This inquiry is carried out after an apparatus number for specifying the single construction machine 56 out of a plurality of construction machines 56 is input from the input section 503 whereby the construction machine 56 designated by a call signal output from the call means 510 is called, and discrimination information transmitted from the construction machine 56 is collated by the ID collation means 511 accordingly.

Subsequently, version number information transmitted from the construction machine 56 through the base station 52 is received (Step S33). Judgement is made by the number collation means 513 if the version number received coincides with the latest version number (Step S35). Prior to the said judgement, control information of the latest version is read together with the version number from the recording medium mounted on the read apparatus 504 and stored in the RAM 509, and the version number stored in the RAM 509 is collated with the version number received.

Then, when the judgement is denied in Step S35, judgement is made that control information of the latest version is not taken into the construction machine 56, and control information of the latest version taken into the RAM 509 is transmitted by instructions from the transmission instructions means 514 (Step S37).

Thereafter, when updating of the latest version by control information is completed, whether or not the updating completion signal transmitted from the construction machine 56 is received is discriminated by a updating completion conformation means (Step S39). When this judgement is affirmed, the updating operation with respect to the construction machine 56 designated is terminated, whereas when the judgement is denied, one stands-by till the judgement is affirmed. When in Step S35, the judgement is affirmed, judgement is made that control information of the latest version has been already taken into the construction machine 56 designated to complete the updating operation with respect to the construction machine 56. Thereby, useless updating operation need not be carried out, and the updating operation can be carried out effectively.

Figure 6:
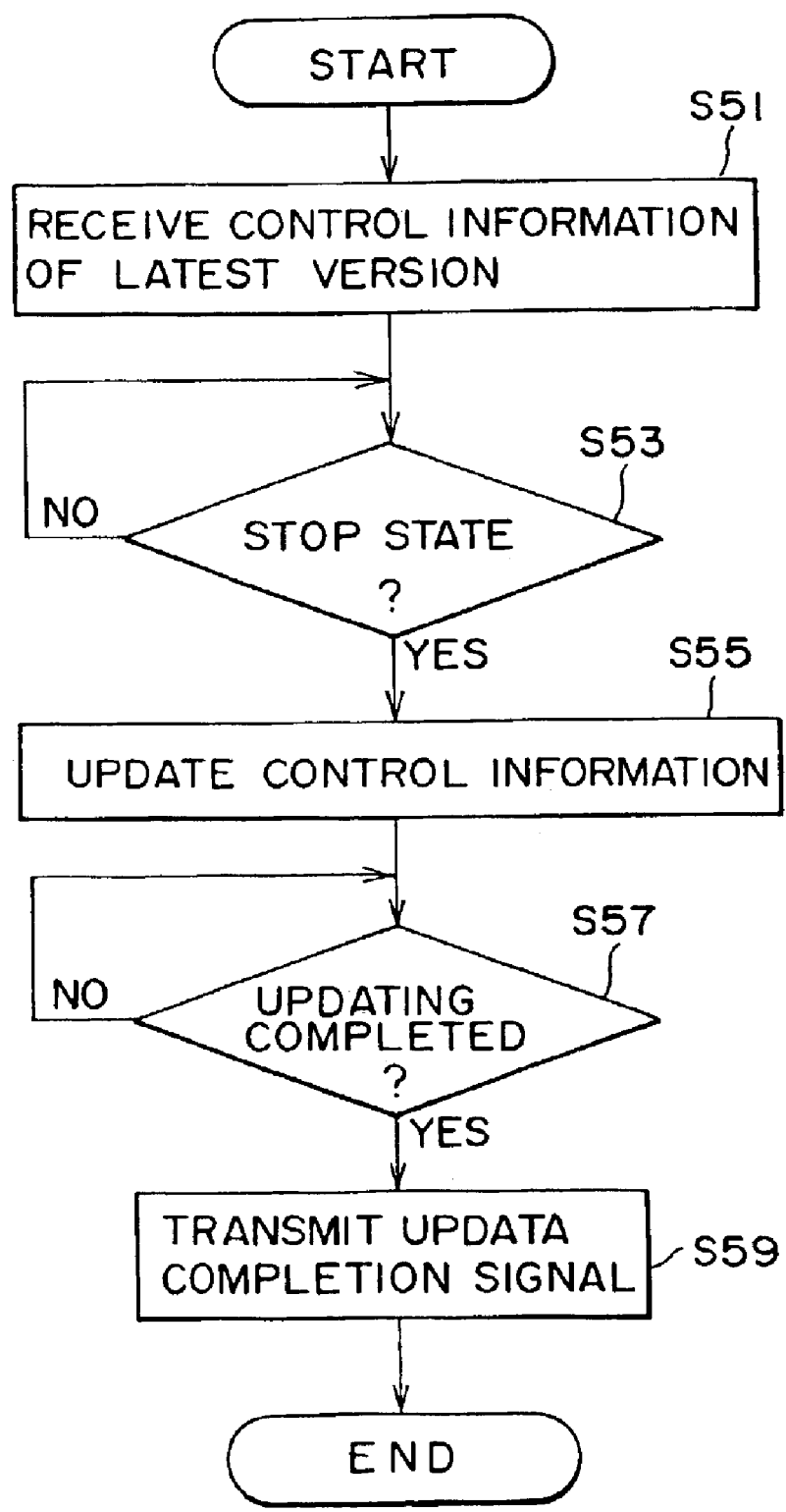
FIG. 6 is a flowchart for explaining the operation on the side of the construction machine of the information management system shown in FIG. 4.

Now, the outline of transmit-receive operation of information on the side of the construction machine 56 of the information management system constituted as described above will be described with reference to a flowchart shown in FIG. 6.

First, control information of the latest version transmitted from the information rewriting apparatus 50 through the communication satellite 54 is received in the construction machine 56 (Step S51). The latest version control signal received is once taken into the RAM 583. Upon receipt thereof, discrimination information is transmitted from the construction machine 56 according to the call from the information rewriting apparatus 50 whereas the version number of control information stored in the memory 584 is read by the version number read means 590 according to the inquiry from the information rewriting apparatus 50 and is transmitted to the information rewriting apparatus 50 in accordance with instructions from the transmission instructions means 591. In the information rewriting apparatus 50, judgement is made if it is the latest version control information.

Subsequently, discrimination is made by the stop discrimination means 592 if the operating section of the construction machine 56 is in an operation stop state (Step S53). When the judgement is affirmed, the latest version control information taken into the RAM 583 by the information updating means 593 is transferred to the memory 584 and control information in the memory 584 is updated (Step S55). When the judgement is denied, the judgement is repeatedly executed till the operation stop state assumes. Note, when the updating operation of control information is executed when the operating section of the construction machine 56 is in an operating state, a program possibly runs away. Therefore, when the operating section of the construction machine 56 is in an operation stop state, the updating operation is executed.

Subsequently, discrimination is made by the updating completion discrimination means 594 to see if the updating is completed (Step S57). When the judgement is affirmed, an updating completion signal is output by the completion signal generation means 595, and transmitted to the information rewriting apparatus 50. Thereby, the updating operation of control information is completed. When in Step S57, the judgement is denied, the judging operation is repeatedly executed till updating is completed.

As in the above-mentioned embodiment, in the information management system according to the present invention, it is possible to update control information at real time without a serviceman going, and to positively manage the construction machine in the management center.

While in the present embodiment, a disclosure is made that the present invention is applied to a construction machine such as a hydraulic excavator, similar to the previous embodiment, it is to be noted that the invention can be applied also to various construction machines such as trucks, private cars and the like. Accordingly, also with respect to the control information, information having contents according to the construction machine applied is updated.

Further, while in the present embodiment, control information is transmitted from the information rewriting apparatus 50 to the construction machine 56 through the base station 52 and the communication satellite 54, it is to be noted that the transmission can be made merely through the communication satellite 54 with the base station 52 removed. In this case, the information rewriting apparatus 50 may have the function similar to that of the base station 52. In short, the constitution may be provided such that control information can be transmitted from the information rewriting apparatus 50 to the construction machine 56 through the communication satellite 54 irrespective of the presence or absence of the base station 52.

Further, while in the present embodiment, the version number of the current control information stored in the memory 584 of the construction machine 56 is confirmed, and in the case of not the latest version, the control information is updated to the latest version, it is to be noted that the control information may be forcibly updated without confirmation of the current version number.

Next, an example of the management system applied as an anti-theft system according to the present invention will be described below.

This management system utilizes a satellite and thereby can surely prevent the theft of even construction machines such as hydraulic excavators present in a remote place where the management is unsatisfactory.

Figure 7:
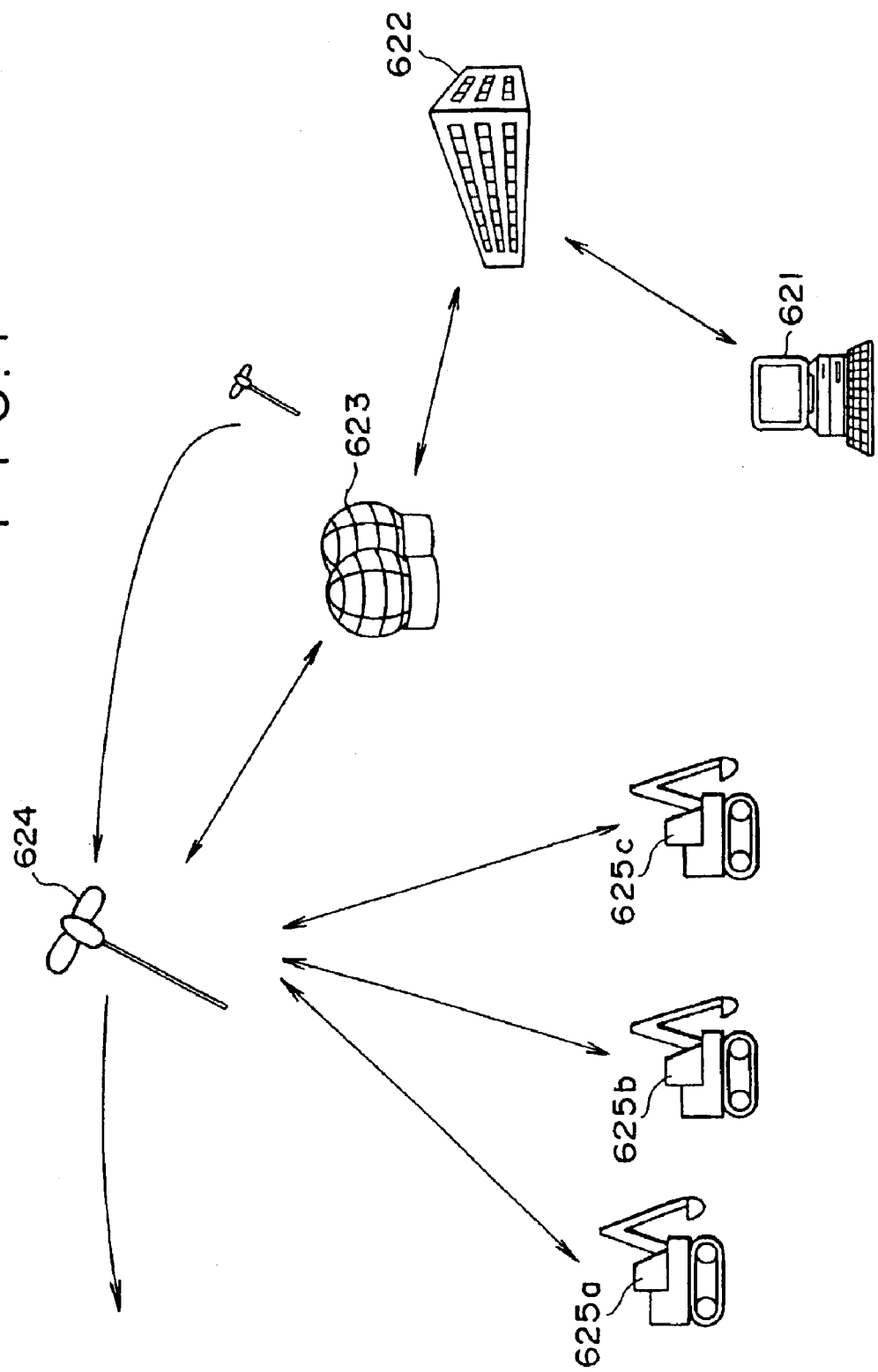
FIG. 7 is a schematic view showing the constitution of an example of the control system applied as an anti-theft system according to the present invention.

FIG. 7 illustrates the configuration of an anti-theft system which utilizes the communication satellite. In the same figure, a manager of construction machine such as hydraulic excavators has a personal computer terminal 621, which is connected to a satellite management company 622 through the internet for example. The satellite management company 622 transmits a signal from a satellite earth station 623 toward a low-orbit satellite 624.

The communication satellite 624 relays the signal transmitted from the satellite earth station 623 to, say, hydraulic excavators 625*a*, 625*b* and 625*c* as objects of management. The hydraulic excavators are each equipped with a transmitter-receiver and a signal outputted from each hydraulic excavator can be transmitted to the personal computer terminal 621 through the route of communication satellite 624→satellite earth station 623→satellite management company 622→personal computer terminal 621.

Figure 8:
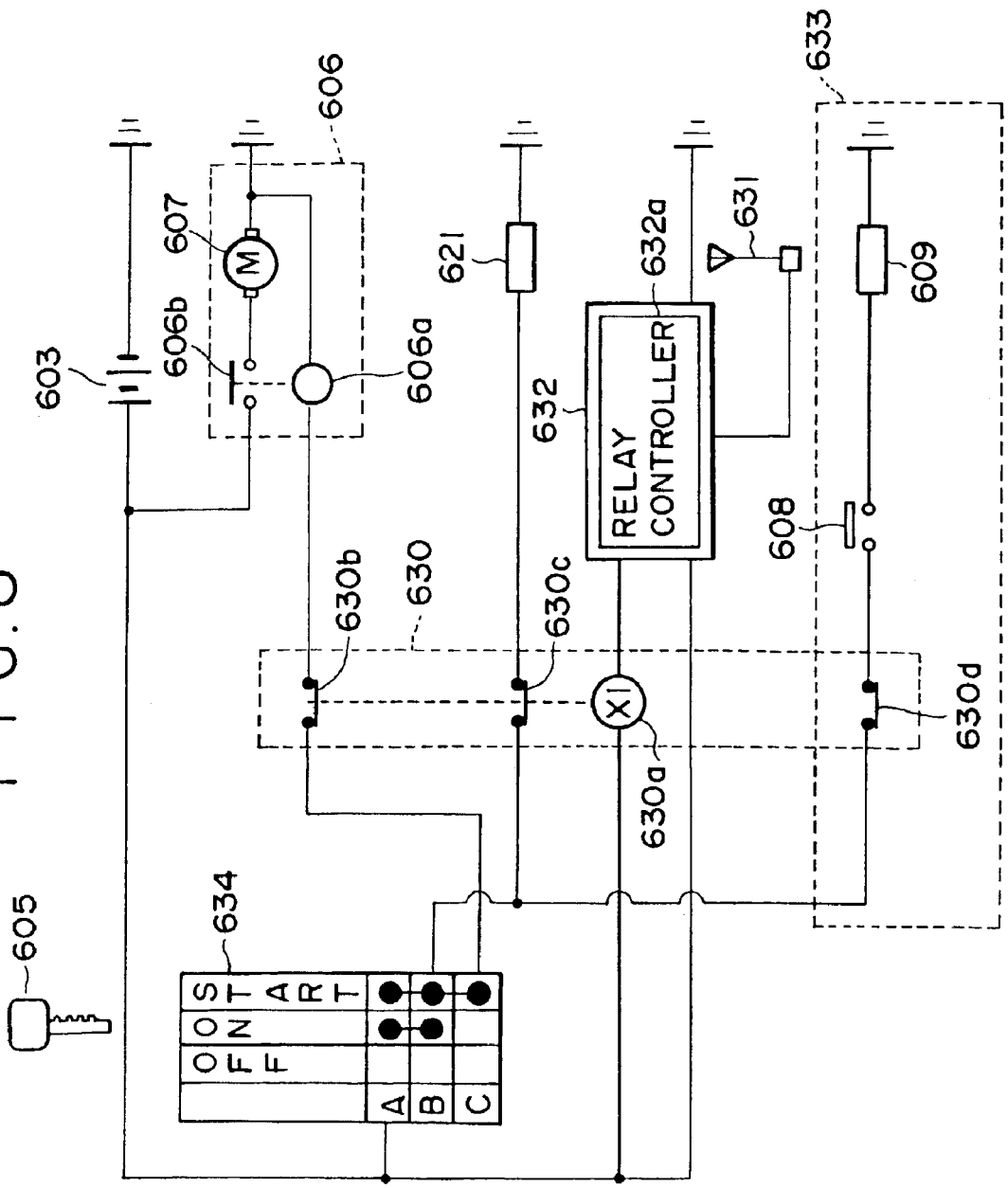
FIG. 8 is a constitution view of an anti-theft device mounted in a hydraulic excavator shown in FIG. 7.

The constitution of an anti-theft device installed in each of the hydraulic excavators 625*a* to 625*c* is shown in FIG. 8. In the same figure, the reference numeral 634 denotes a key switch for switching over from one connection pattern to another among terminals A, B and C, the terminal A being connected to a battery 603. The electromagnetic relay 630 is provided with an electromagnetic coil 630*a* and contacts 630*b*, 630*c* and 630*d* which are closed upon flowing of an electric current in the coil 630*a*. An input side of the contact 630*b* is connected to the terminal C, while an output side thereof is connected to an electromagnetic coil 606*a* of an engine starter relay 606. When an electric current flows in the electromagnetic coil 606*a*, a contact 606*b* closes and an engine starter motor 607 rotates. An engine stop solenoid 621 when energized can drive the engine, while when de-energized it can cut off the supply of fuel to stop the engine. An electromagnetic coil 630*a* is normally OFF, that is, de-energized, and contacts 630*b* and 630*c* are normally closed. Therefore, the engine starter motor 607 can rotate and the supply of fuel is not cut off.

In such a constitution, when an operation stop signal is transmitted from the communication satellite 624 toward each hydraulic excavator, the operation stop signal is received by an antenna 631 and provided to a satellite communication unit 632. A relay controller 632a in the satellite communication unit 632 receives the operation stop signal and energizes the electromagnetic coil 630a.

When the electromagnetic coil 630a is energized, the contact 630c becomes open and the supply of electric current to the engine stop solenoid 621 is cut off, so that the supply of fuel is cut off and the engine stops. Upon opening of the contact 630c, the contact 630b also opens, whereby the power circuit to the engine starter motor 607 is cut off, thus making engine starting impossible.

In FIG. 8, a circuit 633 surrounded with a broken line is a hydraulic unloading circuit which may be added for making theft prevention more reliable. The contact 630d is connected in parallel with the electromagnetic coil 630a to constitute a self-holding circuit. An input side of the contact is connected to the terminal B, while to an output side thereof are connected a lever lock limit switch 608 and a lever lock solenoid 609 in series in this order. The lever lock limit switch 608 is adapted to conduct current when a lever is depressed to an unlock position. Once the lock lever is pulled up when the operator of the hydraulic excavator gets on or off the excavator, all of operating circuits for traveling, rotation and front attachment are cut off to lock the action of hydraulic pressure so that the machine body does not operate even if the operator's body comes into contact with the operating lever. Thus, the lever lock limit switch 608 functions as a safety device. Upon depression of the lock lever, the locked state of hydraulic pressure is released and it becomes possible to effect the operations for traveling, rotation and front attachment. When the lever lock solenoid 609 is energized, hydraulic oil is supplied to each hydraulic actuator. A contact 630d is normally closed, and once the contact 630d is opened by the controller 632a, the lever lock limit switch 608 is not closed even by depressing the lock lever to the unlock position, and the lever lock solenoid 609 is not energized, whereby the circuit for the supply of the hydraulic oil to the hydraulic actuator is cut off.

Thus, in the anti-theft system which utilizes an artificial satellite, by transmitting an operation stop signal to a hydraulic excavator present in a remote place at the time when the theft of the excavator has become clear, it is possible to make control under the utilization of satellite communication so that the engine of the hydraulic excavator cannot be started, or the engine is stopped, or the machine body cannot be operated hydraulically.

In the generally known anti-theft device only a power circuit to the starter motor is cut off, but in the example of the above anti-theft device not only the power circuit to the starter motor but also the circuit for the supply of pressure oil to each hydraulic actuator and the circuit for the supply of fuel to the engine are cut off. This is because if only the power circuit to the starter motor is cut off, the theft of the excavator concerned can be done by directly connecting the battery and the starter motor with each other. Only one of the circuit for the supply of pressure oil to the hydraulic actuator and the circuit for the supply of fuel to the engine may be cut off at the time of breaking the power circuit to the starter motor.

By combination with, for example, a global positioning system (GPS) the anti-theft system of the present invention can be realized as a higher grade of an anti-theft system. As known well, the GPS is a highly accurate positioning system in which data transmitted from at least three artificial satellites are received by a receiver installed on the earth and a three-dimensional position of the receiver is determined on the basis of the received data.

A hydraulic excavator which travels for itself through a crawler covers only a narrow range of movement, so if moves over a long distance, it is possible to presume that the excavator is being thieved while being carried on a trailer or the like. In this case, a map of the work site where the hydraulic excavator is present is displayed on the display of the personal computer terminal 21 and a work area of the hydraulic excavator is indicated with a circle on the map. For input of the work area, for example, a central point and radius thereof may be inputted as coordinates from a keyboard, or an arbitrary range on the may be designated using a pointing device such as a tablet or the like.

Then, by displaying the position of the hydraulic excavator measured by the GPS superimposedly on the thus-inputted work area on the map, it is possible to check whether the hydraulic excavator as the object of management is positioned within the normal work area or not. If the answer is negative, an alarm is sounded and an engine stop signal is transmitted to the hydraulic excavator.

Thus, where there is added the function of measuring the position of each hydraulic excavator by utilizing the GPS, the operation of the hydraulic excavator can be stopped when the hydraulic excavator has deviated or is deviating a preset work area, whereby the occurrence of theft can be prevented.

What is claimed:

1. A management system for a construction machine, comprising:

a memory means for storing a management information of the construction machine, said management information being operating information relating to time of operation of the construction machine;

a communication means for carrying out transmission and reception of said management information of the construction machine with management center for managing said construction machine using said management information;

a read-out means for reading out said operating information stored in the memory means for the purpose of transmitting said operating information to the management center;

a discrimination means for discriminating if said read-out means fulfills predetermined readable conditions of the operating information stored in the memory means; and an anti-theft device adapted to cause the construction machine to stop operation in case of receipt by the anti-theft device of a control information relating to an operation stop signal transmitted from the management center.

2. The management system for a construction machine according to claim 1, wherein in a work area of the construction machine is set in advance, position of the construction machine is measured using a GPS, and when the position measured of the construction machine is outside the work area, the operation stop signal is transmitted to the construction machine.

3. The management system for a construction machine according to claim 1, wherein said anti-theft device cuts off a power circuit to a starter motor of the construction machine.

4. The management system or a construction machine according to claim 3, wherein said anti-theft device further cuts off a circuit for supply of pressure oil to each of hydraulic actuators of the construction machine.

5. The management system for a construction machine according to claim 3, wherein
said anti-theft device cuts off a circuit for supply of fuel to an engine of the construction machine.

6. The management system for a construction machine according to claim 1, wherein
said anti-theft device cuts off all of a power circuit to a starter motor, a circuit for supply of pressure oil to each of hydraulic actuators, and a circuit for supply of fuel to an engine of the construction machine.

* * * * *

UNITED STATES PATENT AND TRADEMARK OFFICE
CERTIFICATE OF CORRECTION

PATENT NO. : 7,019,668 B2
DATED : March 28, 2006
INVENTOR(S) : Kinugawa

It is certified that error appears in the above-identified patent and that said Letters Patent is hereby corrected as shown below:

<u>Title page,</u>
Item [73], should read:
-- [73] Assignee: **Kabushiki Kaisha Kobe Seiko Sho
(Kobe Steel, Ltd.)** Kobe (JP) --.

Signed and Sealed this

Thirtieth Day of May, 2006

JON W. DUDAS
*Director of the United States Patent and Trademark Office*